June 25, 1963

G. L. NEELY 3,095,062

OIL CHANGE SYSTEM

Filed Nov. 10, 1961

INVENTOR.
GEORGE L. NEELY
BY
ATTORNEYS

June 25, 1963 G. L. NEELY 3,095,062
OIL CHANGE SYSTEM
Filed Nov. 10, 1961 6 Sheets-Sheet 4

INVENTOR.
GEORGE L. NEELY
BY P. E. Johnston
Ralph L. Freeland Jr.
ATTORNEYS

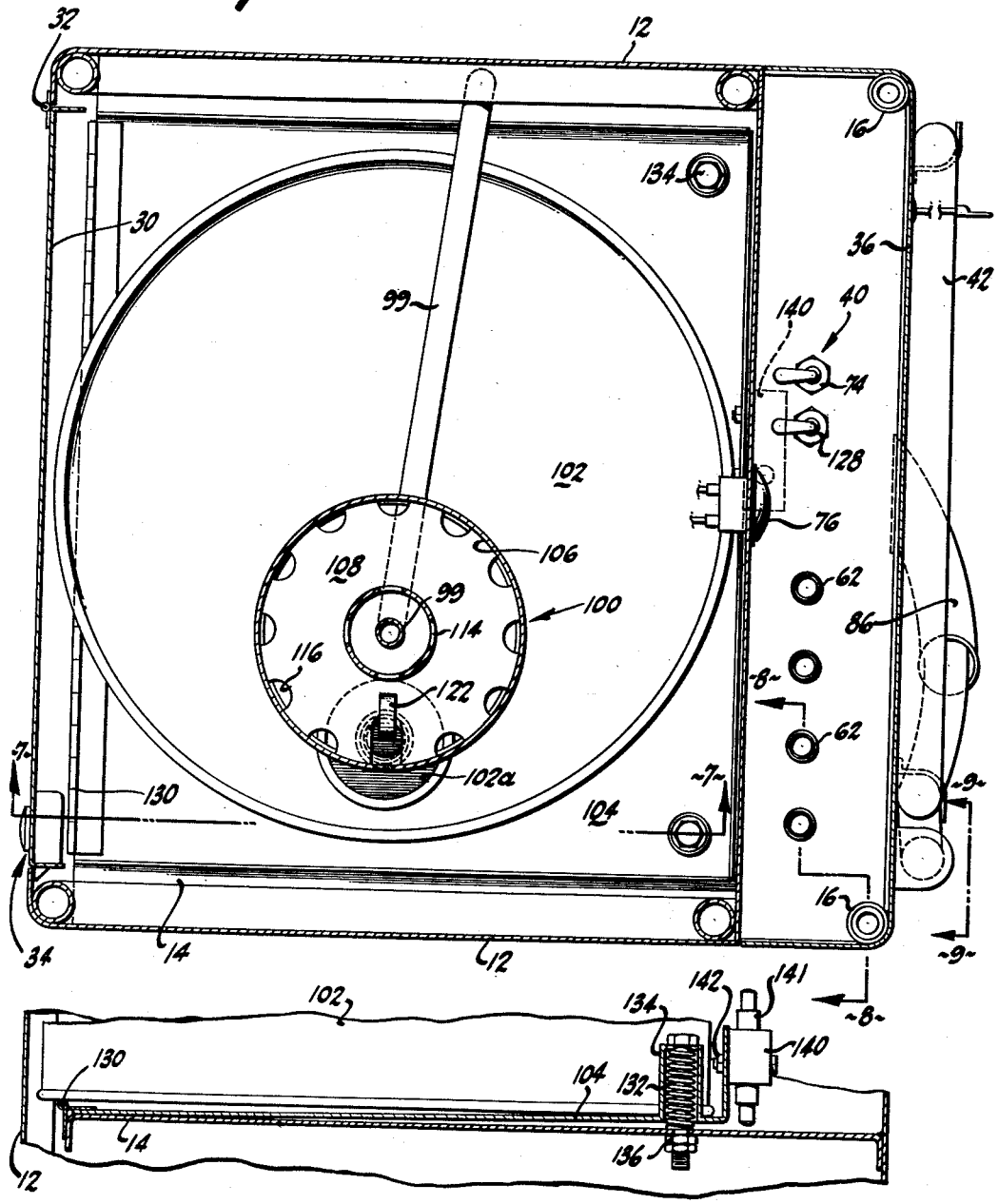

June 25, 1963  G. L. NEELY  3,095,062
OIL CHANGE SYSTEM
Filed Nov. 10, 1961  6 Sheets-Sheet 6
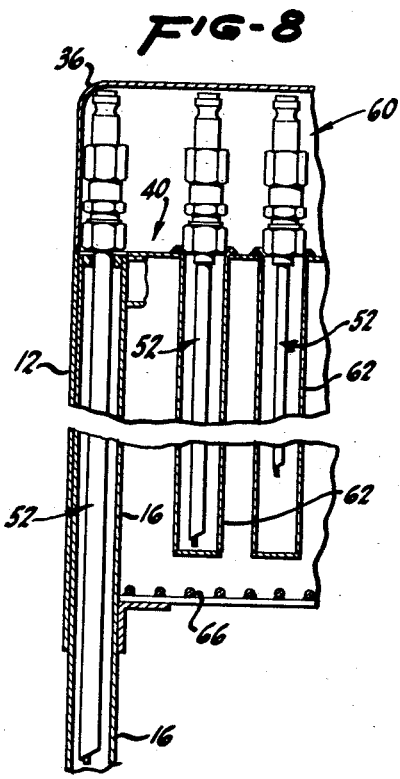
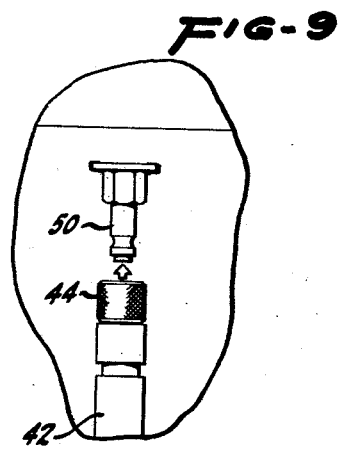
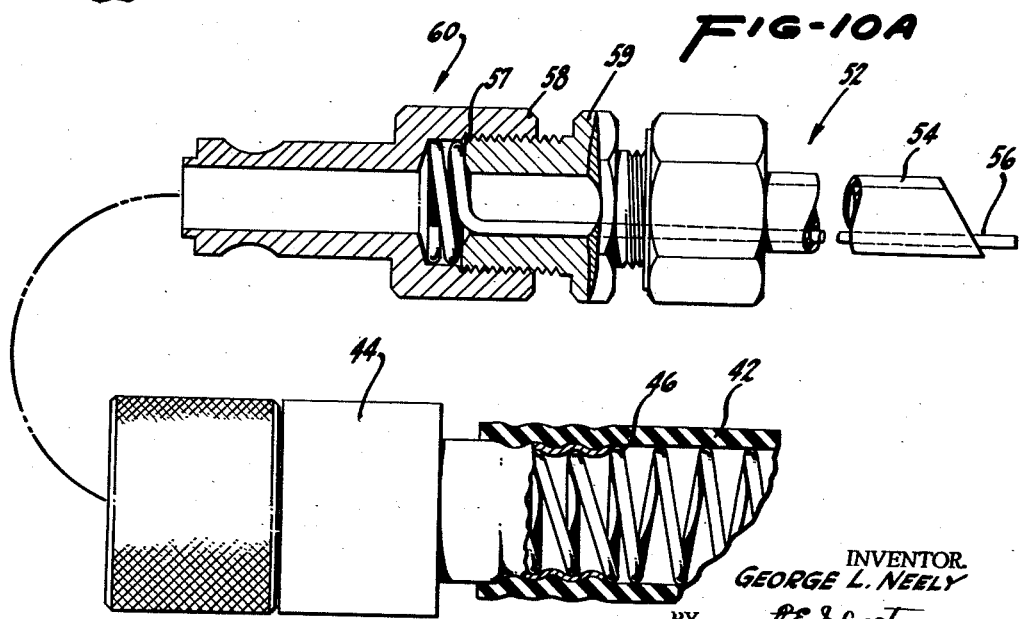
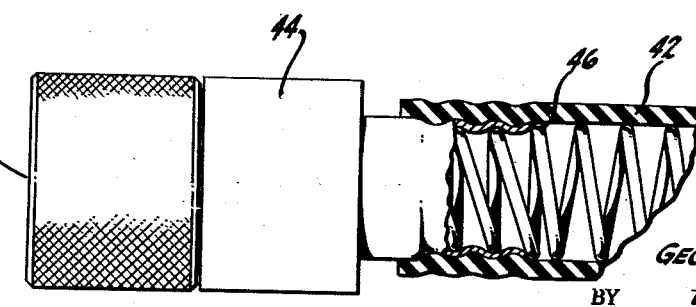
INVENTOR.
GEORGE L. NEELY
BY
ATTORNEYS

United States Patent Office 3,095,062
Patented June 25, 1963

3,095,062
OIL CHANGE SYSTEM
George L. Neely, Berkeley, Calif., assignor to California Research Corporation, San Francisco, Calif., a corporation of Delaware
Filed Nov. 10, 1961, Ser. No. 151,494
14 Claims. (Cl. 184—1.5)

This invention relates to a crankcase evacuating apparatus and, more particularly, to an apparatus for rapid evacuation of an automobile crankcase without requiring removal of the automobile to a special facility, such as a grease rack or hoist.

The desirability of a device capable of draining an automobile crankcase quickly while the gasoline tank of the automobile is being filled has long been recognized. Service station customers have demonstrated a reluctance to wait while an oil change is being effected, even where it is possible to avoid prolongation of the waiting time resulting from repeated diversions of the service station operator's attention to the needs of other customers at the gasoline pumps. As a consequence, customers often leave their automobiles for lubrication and oil change while they are otherwise occupied, for example, during the business day. However, while this affords the station operator an opportunity to schedule oil changes according to his work load, it raises another problem in that he is frequently required to accommodate a number of cars on his station premises. Thus, there is a need by both the public and the service station operators for a quick and effective way of changing oil.

It has been suggested that the oil might be pumped from the crankcase by insertion of a suction hose into the fill pipe or even the dip stick guide tube. However, with conventional suction devices, the operator has no way of knowing whether or not the open end of the suction tube is situated at or near the bottom of the crankcase sump for complete removal of the dirty, worn oil. Moreover, the dip stick guide tube rarely extends straight into the crankcase but bends and curves around engine components in order that the dip stick be accessible to the operator. Consequently, the suction tube must be flexible. However, it must also have sufficient elasticity to overcome deformation so that it may be directed to the bottom of the crankcase and not tend to curve off in an unpredictable direction.

It is, therefore, an object of this invention to provide means for draining an automobile crankcase rapidly without requiring access to the usual drainage plug or removal of the automobile to a location having special facilities for this purpose.

It is a further object of this invention to provide a system by means of which oil may be removed from the crankcase through the dip stick guide tube.

It is a further object of this invention to provide an oil suction tube adapted to be inserted through a curved dip stick guide tube of an automobile engine without permanently deforming the tube and causing the end thereof to be diverted away from its intended location at the bottom of the crankcase sump.

It is a further object of this invention to provide an apparatus for evacuation of a crankcase through a suction tube including means for signalling proper location of the tube at the bottom of the crankcase.

In carrying out this invention, a pump is provided on a portable cart or framework and preferably driven by a battery-operated electric motor. A series of suction wands or tubes of various diameters and lengths to be accommodated by the dip tick guide tubes of all automobiles to be serviced are adapted for selective coupling to the pump intake hose. Each of the wands is of a flexible, non-conductive material, with a conductive rod along its length having sufficient elastic restoring force to overcome any flexural deformation of the wand. The tip of the elastic restoring rod protrudes beyond the end of the wand and it is connected electrically to a signal device, which indicates contact of the rod with the metallic bottom of the crankcase sump. Once contact is established, the pump motor circuit may be activated and the crankcase drained. Interposed in the discharge line of the pump is a unique visible flow device by means of which removal of the dirty crankcase oil may be observed.

Other objects and advantages of this invention will become apparent from the specification following when read in connection with the accompanying drawings wherein:

FIG. 6 is a section view taken along the line 6—6 of FIG. 4;

FIG. 7 is a partial section view taken along line 7—7 of FIG. 6;

FIG. 8 is a partial section view taken along line 8—8 of FIG. 6;

FIG. 9 is a partial view of the evacuation system housing taken along line 9—9 of FIG. 6 and showing the suction hose mounting; and FIGS. 10A and 10B are enlarged views, partially in section, of the suction hose and wand forming parts of this invention.

Figure 1:
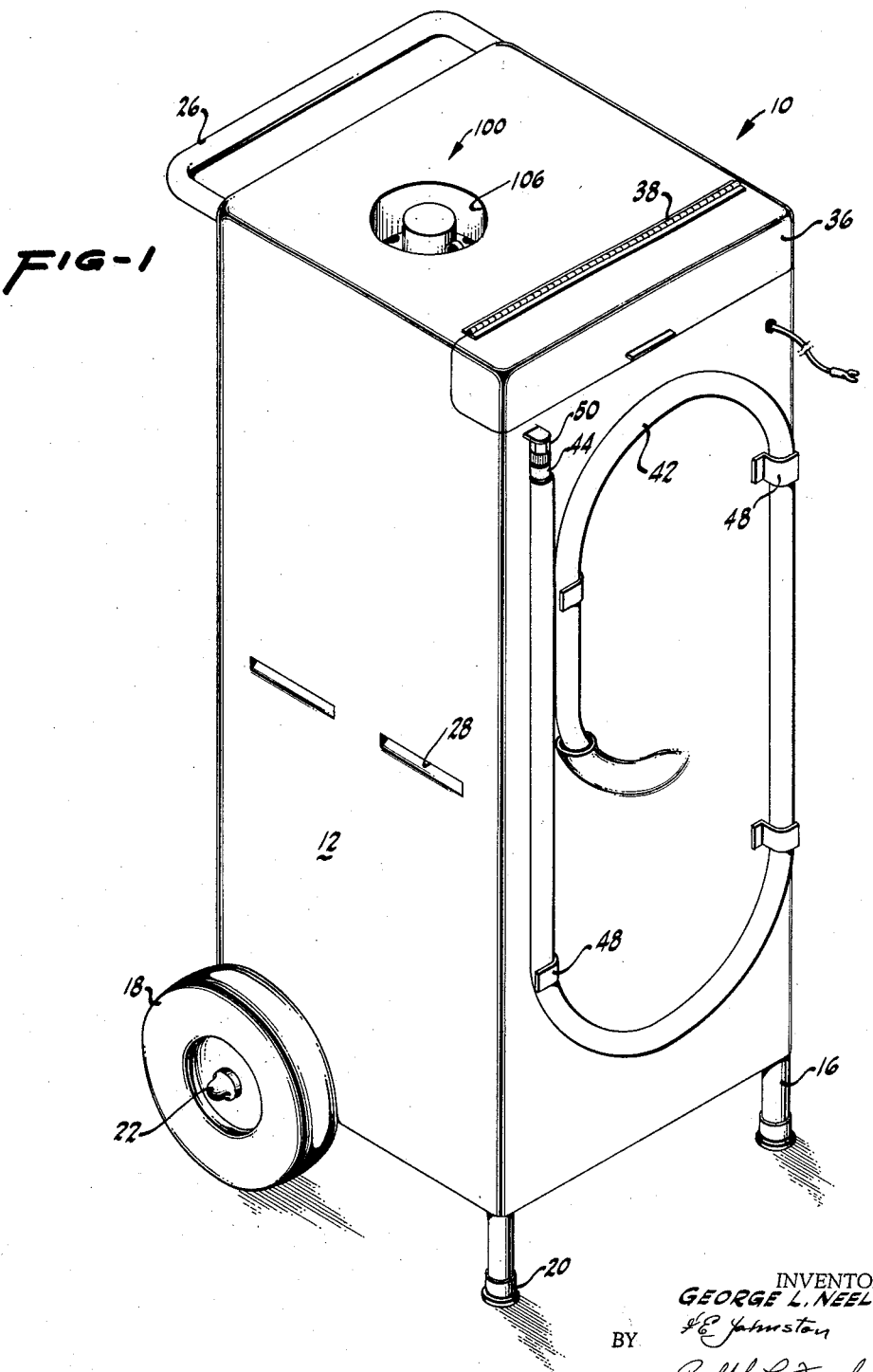
FIG. 1 is an isometric view of the portable, rapid crankcase evacuation apparatus of this invention.

Referring more particularly to the drawings, the quick oil change apparatus of this invention preferably is mounted on a compact and mobile cart 10, so as to facilitate its use in a service station. However, the specific type of supporting structure employed is subject to wide variation. The cart 10 comprises a housing or enclosure 12 formed about frame members 14 including upright tubular legs 16 which, with wheels 18, provide mobile support for the housing 12. Preferably the wheels 18 have rubber tires, and cup-like feet 20 of rubber, plastic or the like are provided on the bottoms of legs 16. It is apparent that the housing 12 may be tilted back about the axis 22 of the wheels 18 by exerting pedal pressure against a kick bar 24, whereby the quick-change cart 10 may be moved about from place to place on the wheels 18 while steering the cart by manipulation of the handlebar 26.

Preferably, the housing is vented through suitable louvred openings 28 to prevent accumulation of gases therein, and access to the interior is provided by means of a door 30 on the back side (FIG. 6) pivoted at 32 to the frame and selectively opened by any suitable latch means shown at 34. Additionally, on the front upper portion of the housing 12, a panel cover 36 is hingedly mounted at 38 so that it may be raised to provide access to the control panel 40 for the apparatus of this invention (FIG. 6).

A flexible hose 42 of a non-conductive material, such as a suitable plastic, extends from the housing and terminates in a coupling element 44, preferably of the quick-connect type. The hose (FIG. 10B) is of conventional structure having therein a spiral winding of an electrically conductive wire 46. Besides conducting an electric signal in a manner hereinafter to be described, the wire 46 provides a certain amount of elasticity and body to the hose and resists any tendency to kink. Alternatively, the wire may be embedded within the plastic of the hose, or it may be insulated and secured along the outside of the hose, but the embodiment illustrated is preferred. In whichever manner the wire is carried on the hose 42, one end thereof is connected to a source of electricity, as hereinafter described, and the other end is connected, as shown in FIG. 10B, to the metallic female coupling element 44 which is secured onto the free end of the hose 42. When not in actual use, the hose 42 may be coiled about brackets 48 on the front side of the housing 12 and secured in place by attaching the female coupling element 44 on the end to a complementary male coupling element 50 secured onto the front of the housing 12 (FIG. 9).

Figure 2:
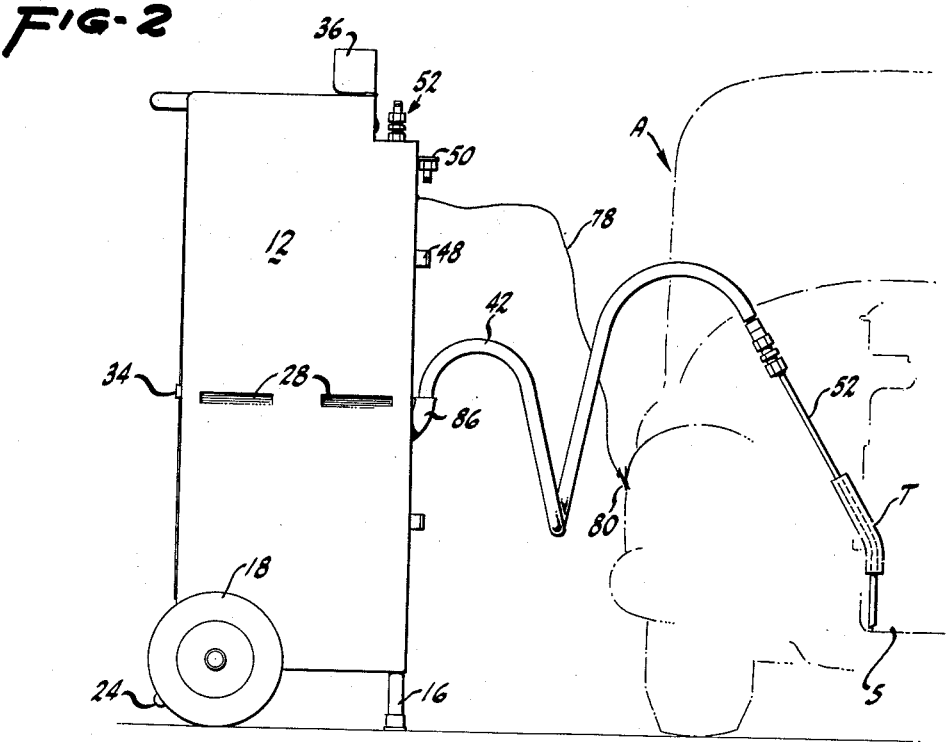
FIG. 2 is an illustration of the apparatus of this invention in position for operation.

Adapted to be removably and interchangeably secured to the end of the hose is a series of suction wands or tubes 52, shown specifically in FIGS. 10A, 2 and 8. The suction wands or tubes are of various sizes and lengths and each comprises a flexible non-conductive tubular member 54 through which there is extended a combination probe and reforming member 56, preferably comprising a metallic rod or wire of heavy piano wire or the like having sufficient elastic force to overcome and straighten the bends in the flexible tubular member 54, and prevent permanent deformation thereof. Each wand is of a size enabling it to fit and be inserted into the dip stick guide tube T of one or more automobile makes and styles A. For improved accessibility from the engine compartment of an automobile A, the dip stick guide tubes T are frequently curved and bent in one or more directions as they extend downwardly into the crankcase sump S. Thus, the suction tubes or wands 52 must be flexible in order to negotiate these curves and enter into the crankcase sump S for removal of oil therefrom. However, it is also necessary that the suction wand not be permanently deformed as it bends around curves in the guide tube so that it will not divert from its intended path but will continue to be directed downward toward the bottom of the crankcase sump S in order to insure removal of maximum amount of dirty, used oil. It is one function of the forming rod 56 to overcome deformation in the leading portion of the tube 52 after being bent around the curve in the dip stick guide tube and for this purpose it has substantial inherent elastic force. It is another function of the forming rod 56 resiliently to support that portion of the wand protruding from the dip stick guide tube. The nylon tubes of which the wands are preferably made are usually no larger than one-half inch in diameter and, in order to reach the bottom of every crankcase sump, may be as long as 36 inches. Obviously, such a thin, long tube is subject to bending and kinking, particularly since it also supports the weight of hose 42. Thus, the forming rod resiliently supports the protruding portion, relieving the operator of this duty and eliminating the need for supporting frames or the like.

As a further feature of the suction tube, the free end of the forming wire or probe 56 extends a short distance beyond the open end of the suction tube 54, and the other end is secured by any suitable means to the male metallic coupling element 60 secured onto the other end of the suction tube. As illustrated in FIG. 10A the wire may be secured simply by forming a coil 57 at the top end thereof and securing it between the threadedly engaged portions 58 and 59 of the male coupling element. Thus, the forming member not only retains the shape of the suction wand but provides a sort of probe with which to tap the bottom of the crankcase sump S. Again, while the combination forming member and probe 56 illustrated is in the form of an elongate rod, it may be in the form of a spiral or embedded in the plastic itself. It is also to be noted that the probe 56, being connected to the male coupling element, is thereby connected in electrical series with the wire coil 46 in the flexible hose 42 for a purpose to be described.

A series of elongate storage tubes 62 depend from the control panel 40 to provide receptacles within the housing 12 in which the suction tubes may be suspended and stored when not in use. Preferably, the storage tubes 62 are closed at their bottoms to catch any drainage and they may be evacuated as necessary merely by attaching the wand suspended therein to a pump. The tubular frame member legs 16 at the front corners of the housing provide excellent receptacles for extremely long probes which are necessary to reach the bottom of the crankcase sump S in certain automobiles.

Mounted in the lower portion of the housing on a support shelf 66 and secured in position by suitable hold-down bolts 67 and a bracket 68 is a storage battery 70. Referring now to the wiring diagram of FIG. 3 one pole of the battery 70 is connected by conductor 72 to the frame 14 of the housing 12 and is, therefore, connected in series with the spiral wire 46 coiled within the hose 42 and attached to metallic couplings at both ends. Hence, the battery is effectively connected to the metal probe 56 within the suction wand 52. The other battery pole is connected through a manually operated switch 74 to a signal light 76 on the control panel and then to a conductor 78 on the end of which is carried a suitable clip 80 for attachment of the wire to the frame of an automobile A. Thus, since the suction tube or wand 52 is also connected electrically to the battery, the electric circuit is completed when the end of the probe 56 touches the metallic bottom of the crankcase sump S and the manually operated switch 74 is closed. Illumination of the signal light 76 is positive indication that the suction tube 52 is at the bottom of the sump S and that evacuation thereof may commence.

Figure 4:
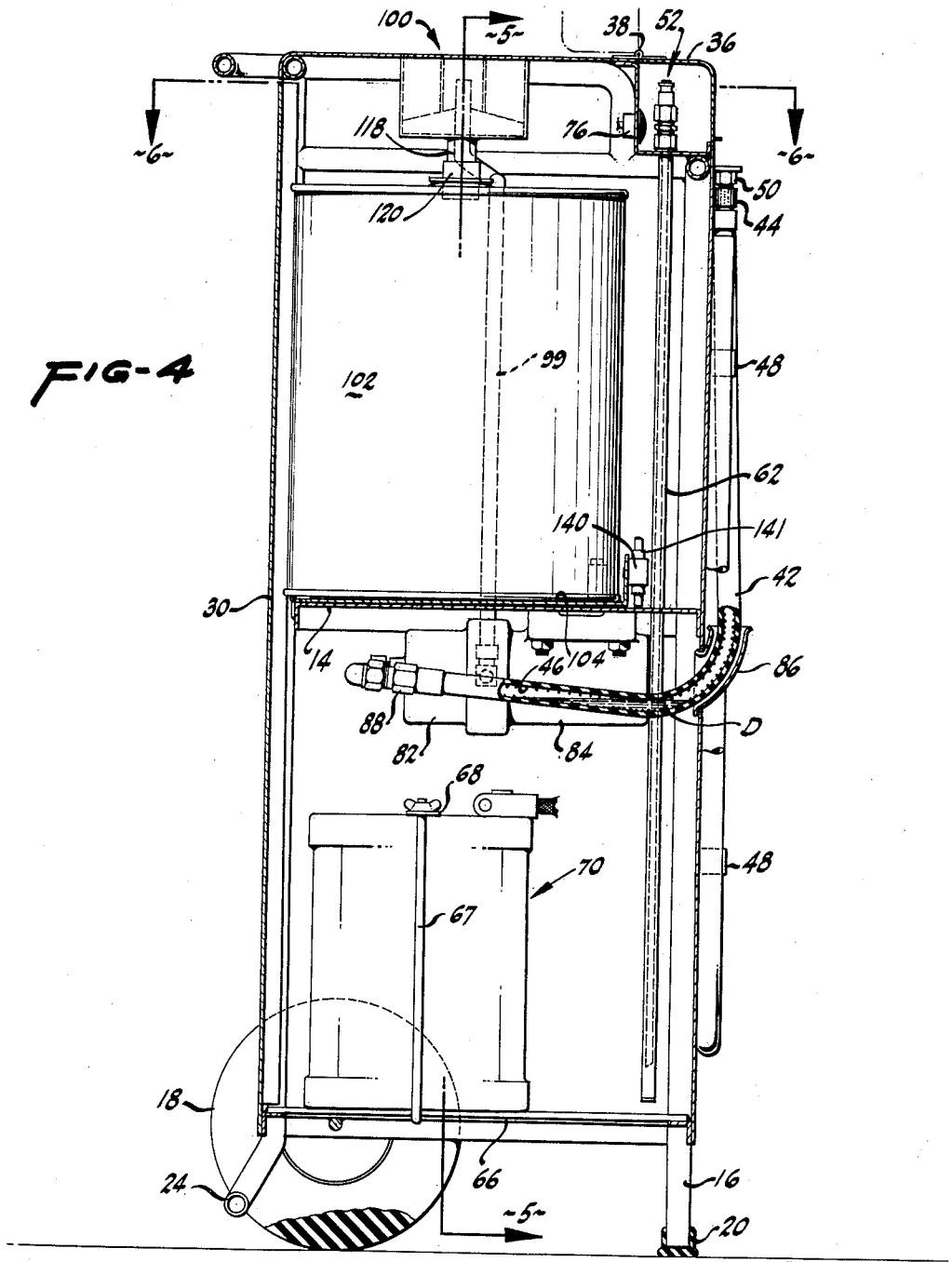
FIG. 4 is a side view in section of the crankcase evacuation apparatus of this invention.

Referring now to FIG. 4 there is also contained within the housing a vacuum pump 82 driven by an electric motor 84. The hose 42 entering the housing 12 may be connected to a metallic conduit or pipe, or it may, as in the embodiment shown, be connected directly to the pump through suitable fittings 88, being guided toward the fittings by a tubular hose guide 86 so that the hose leads to the pump at a slight upward angle in the order of approximately 5° from the horizontal. As so disposed, the low portion of the hose functions as a reservoir for a quantity of crankcase oil D pumped in a previous operation. This quantity of oil is normally at a level below the intake 88 of the pump 82 so that pumping can commence by increasing the vacuum in the chamber provided above the surface of remaining oil. However, it has been found that vacuum pumps of the type herein contemplated frequently give longer service if the pumping components are wetted prior to use, particularly after extended periods of inactivity. For this purpose, the upward slope of the pump intake line is slight enough that when the portable housing 12 is tilted about the wheel axle 22 and moved out to the gasoline pumps at the commencement of a day's work, the tilting is sufficient to cause the oil to flow to the vacuum pump intake 88 and provide necessary lubrication prior to operation.

Rising upward from the vacuum pump is a discharge line 99 which pours the contents of the crankcase sump S through a visible flow device 100 prior to emptying it into a removable container 102 such as a conventional 5-gallon can removably carried within the housing on a platform 104. The visible flow device comprises an open basin or well 106 extending down from the top of the housing and in which is supported a conical flow plate 108, the downwardly sloping surface of which is raised above the bottom of the well 106 by means of a downwardly depending circular flange 110 integral or unitary therewith. Secured to the upper surface of the conical flow plate 108 is an inverted imperforate splash cup 112. The discharge line 99 extends upwardly through the bottom of the well so that the cup and conical flow plate, as a unitary assembly, may slip over the end of discharge line 99 and fit into place at the bottom of the basin or well 106. A series of flow ports 114 are provided around the lower edge of the inverted cup, and a group of discharge slots or ports 116 are provided around the periphery of the conical flow plate so that oil being pumped up through the discharge line 99 flows without splashing down the sloping walls of the flow plate and into the bottom of the well, permitting the service station customer an opportunity to see that the oil is being removed from his crankcase.

Figure 5:
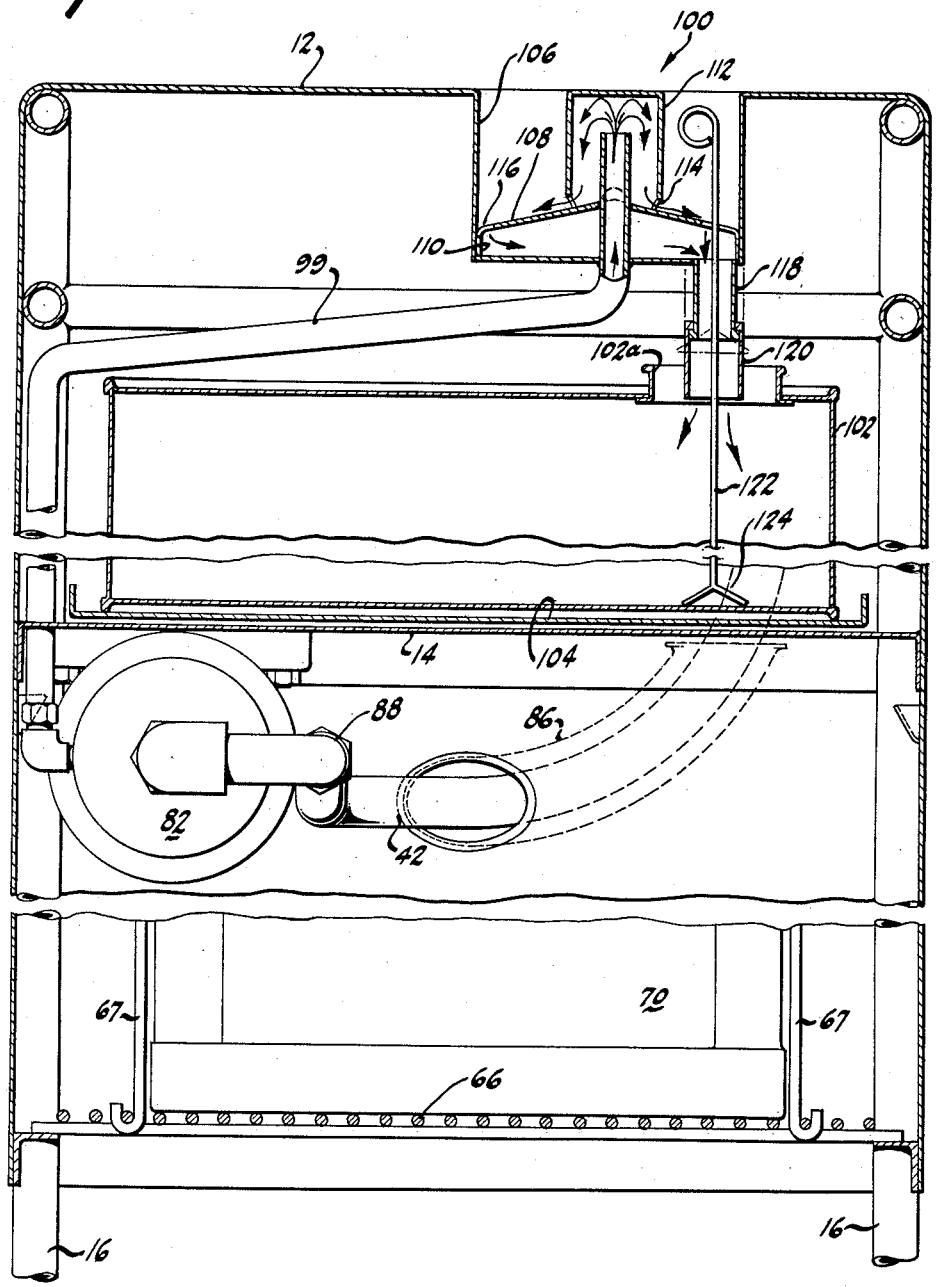
FIG. 5 is a section view taken along the line 5—5 of FIG. 4.

From the bottom of the well 106 the oil dumps into the removable container 102 through a spout 118 depending from the lower end of the well 106 and having a slidable telescopic extension 120 thereon which further alleviates splashing by extending down through the opening 102a of the removable oil can 102. A dip stick 122 extends down through the flow plate 108 and the telescopic spout 118, 120 into the open top of the can 102 so that by appropriate indicia thereon (not shown) a service station operator may tell when the can is ready for dumping. At the lower end of the dip stick is a suitable radial extension 124, such as the conical flange shown, which, when the dip stick is raised to the dotted line position shown in FIG. 5, engages the sliding extension 120 of the spout and lifts it above the top of the pouring lip 102a of the removable can 102, in order to permit removal thereof from the housing 12.

Figure 3:
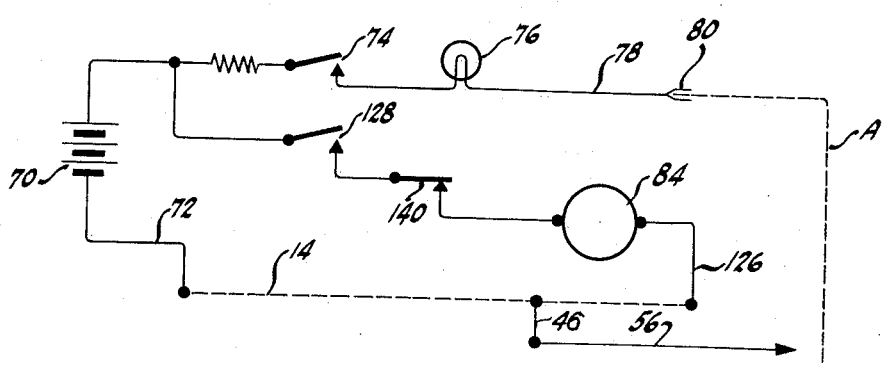
FIG. 3 is a wiring diagram of electrical circuitry forming a part of this invention.

Referring again to the wiring diagram of FIG. 3, the pump motor 84 is connected to one pole of the battery 70 through conductor 126 attached to the housing frame 14 and with the other pole through a second manually operated switch 128 on the control panel. Thus, when the probe 56 extending from the suction wand 52 completes the circuit through the car frame, illuminating the lamp 76 to signal contact with the bottom of the sump S, the signal switch 74 may again be opened and the motor switch 128 closed to energize the pump driving motor 84. As soon as vacuum is attained, the dirty oil is removed from the crankcase through the pump 82 up through the discharge line 99 against the splash cup 112 from whence it flows downwardly over the flow plate 108 into the well 106 and thence through the spout 118 into the removable oil can 102. When oil no longer flows, the motor switch 128 may again be opened, the crankcase having been evacuated through the dip stick guide tube T.

As an additional feature of this invention, the platform 104 upon which the oil can 102 is supported may be pivotably mounted at 130 on the frame 14 of the housing for limited upward and downward movement. The platform is normally held slightly elevated by means of compression springs 132 or the like contained within suitable guides 134 and acting against the frame 14 of the housing. Suitable adjustment means such as the nut 136 may be provided to set the compression spring 132 at the desired biasing force. A normally closed microswitch 140 mounted on the platform is adapted to open upon the slightest downward movement of the platform 104 when the force of the spring is no longer able to support the weight of the container 102. The microswitch may be reset by suitable means such as a reset plunger 141 and preferably is slidably mounted at 142 in order to adjust the amount of movement of platform 104 necessary to open the switch 140. As shown in the diagram of FIG. 3, the opening of microswitch 140 breaks the motor circuit and prevents further operation of the pump motor 84. Thus, the pump cannot be operated when the can is full and, since the reset plunger is at the back of the housing behind the oil can 102, the service station operator cannot circumvent this cut-off means without removing the full container from the housing.

While this invention has been described with reference to the preferred embodiment illustrated, it is to be understood that those skilled in the art may make certain changes and modifications thereto without departing from the spirit and scope of this invention, which is defined by the claims appended thereto.

What is claimed is:

1. A fluid suction conduit adapted to be inserted into a downwardly extending passaegway opening into a fluid reservoir the bottom of which is electrically conductive comprising
   an open-end tubular member of a flexible non-conductive material, and
   a forming member secured within said tubular member to extend longitudinally thereof,
   a tip portion of said forming member extending beyond the open end of said tubular member,
   said forming member being an electric conductor and having sufficient elastic restoring force to overcome flexural deformation of said tubular member.

2. An evacuation system for an engine crankcase having a dip stick guide tube in downward communication therewith comprising
   an open-end tubular member of a non-conductive material adapted to be inserted in the dip stick guide tube,
   an electrically conductive probe secured axially within said tubular member with a tip of said probe protruding beyond the open end of said tubular member,
   a source of electric current,
   an electrically actuated signal device, and
   conductive leads connecting the other end of said probe in series with said signal device, electric current source and the crankcase.

3. The crankcase evacuation system defined in claim 2 wherein said conductive leads include
   an electrically conductive hose coupling element on one end of said tubular member electrically connected to the other end of said probe,
   a hose,
   an electrically conductive complementary coupling element on said hose, and
   a conductor along said hose electrically connected to said complementary coupling element.

4. The crankcase evacuation system defined in claim 2 including
   a fluid pump,
   fluid conduit means connecting said tubular member to said pump, and
   selectively actuated electrically operated pump driving means connected to said source of electricity.

5. An evacuation system for an engine crankcase having a dip stick guide tube in downward communication therewith comprising
   an open-end tubular member of a flexible non-conductive material adapted to be inserted in the dip stick guide tube,
   an elongate electrically conductive probe secured within said tubular member to extend axially thereof with one end tip portion of said probe extending beyond the open end of said tubular member,
   said probe having sufficient elastic restoring force to overcome flexural deformation of said tubular member,
   a source of electric current,
   said probe being connected to said source,
   an electrically actuated signal device connected to said source and adapted to be connected to the crankcase,
   a fluid pump in communication with said tubular member,
   electrically actuated pump driving means,
   conductor means connecting said pump driving means across said source, and
   selectively operated on-off switch means interposed in said conductor means.

6. The crankcase evacuation system defined in claim 5 including
   a discharge conduit extending upward from said pump,
   a conical flow plate,
   said discharge line extending upward through the apex of said conical plate,
   an inverted splash cup having an imperforate top secured to extend upward from said flow plate around said discharge line, openings in said splash cup around the lower edge thereof, flow ports around the periphery of said flow plate, and collection means below said flow plate to receive fluid flowing through said ports.

7. A portable sump evacuation system comprising a pump, an inlet conduit adapted to be extended into a sump, a discharge conduit extending upward from said pump, a conical flow plate, said discharge line extending upward through the apex of said conical plate, an inverted splash cup having an imperforate top secured to extend upward from said flow plate around said discharge line, openings in said splash cup around the lower edge thereof, flow ports around the periphery of said flow plate, and collection means below said flow plate to receive fluid flowing through said ports.

8. The portable pump evacuation system defined in claim 7, including an intake reservoir connected between said inlet conduit and said pump, a frame member on which said pump and reservoir are mounted, and support means including a pair of wheels for said frame member, said frame member being adapted to be tilted about the axis of said wheels for rolling support thereby, and said intake reservoir being disposed below said pump and relative thereto so that fluid in said reservoir flows to said pump when said frame member is tilted.

9. The portable pump evacuation system defined in claim 7 wherein said collection means includes a basin mounted below said flow plate, a telescopically extensible spout depending from said basin, a platform spaced below said spout, and a removable container supported on said platform, said container having an opening in the top thereof to receive said spout when extended.

10. The portable pump evacuation system defined in claim 9 including a movable dip stick supported in a lowered position wherein said dip stick extends down through said spout and said opening, but being conditioned to be raised for visual indication of the level of fluid in said container, and means on the lower end of said dip stick to engage and telescopically retract said spout from said opening when said dip stick is raised.

11. The portable pump evacuation system defined in claim 9 including means mounting said platform for generally vertical movement, biasing means urging said platform to an upper position, said biasing means being conditioned to be overcome by a predetermined weight on said platform achieved when said container is substantially full, and means for inactivating said pump when said biasing means is overcome.

12. A portable sump evacuation system comprising a vacuum pump, a suction line adapted to be extended into a sump, an intake reservoir connected between said suction line and said vacuum pump, a frame member on which said pump and reservoir are mounted, and support means including a pair of wheels for said frame member, said frame member being adapted to be tilted about the axis of said wheels for rolling support thereby, and said intake reservoir being disposed below said pump and relative thereto so that fluid in said reservoir flows to said pump when said frame member is tilted.

13. A portable sump evacuation system comprising a pump, a suction line adapted to be extended into a sump, a discharge line extending upward from said pump, a conical flow plate, said discharge line extending upward through the apex of said conical plate, an inverted splash cup having an imperforate top secured to extend upward from said flow plate around said discharge line, openings in said splash cup around the lower edge thereof, flow ports around the periphery of said flow plate, and collection means including a basin mounted below said flow plate, a telescopically extensible spout depending from said basin, a platform spaced below said spout, and a removable container supported on said platform, said container having an opening in the top thereof to receive said spout when extended, a movable dip stick supported in a lowered position wherein said dip stick extends down through said spout and said opening but being conditioned to be raised for visual indication of the level of fluid in said container, and means on the lower end of said dip stick to engage and telescopically retract said spout from said opening when said dip stick is raised.

14. In combination with a fluid pump, visible flow means for transmission of discharge from said pump comprising an open well, a conical flow plate disposed in the lower portion of said well, an open end discharge line from said pump extending upwardly through the bottom of said well and the apex of said flow plate, an inverted cup having an imperforate top secured around and above the open end of said discharge line, flow ports around the lower edge of said inverted cup, discharge ports around the periphery of said conical flow plate, and a flow spout opening from the bottom of said well.

References Cited in the file of this patent

UNITED STATES PATENTS

| 1,116,466 | Mulligan | Nov. 10, 1914 |
| 2,200,967 | Phillips | May 14, 1940 |
| 2,477,450 | Gray | July 26, 1949 |
| 2,640,502 | Powers | June 2, 1953 |
| 2,910,940 | Colman et al. | Nov. 3, 1959 |

FOREIGN PATENTS

| 534,263 | Great Britain | Mar. 31, 1941 |